(No Model.) 2 Sheets—Sheet 2.
E. WILLIAMS.
WINDMILL.
No. 504,185. Patented Aug. 29, 1893.
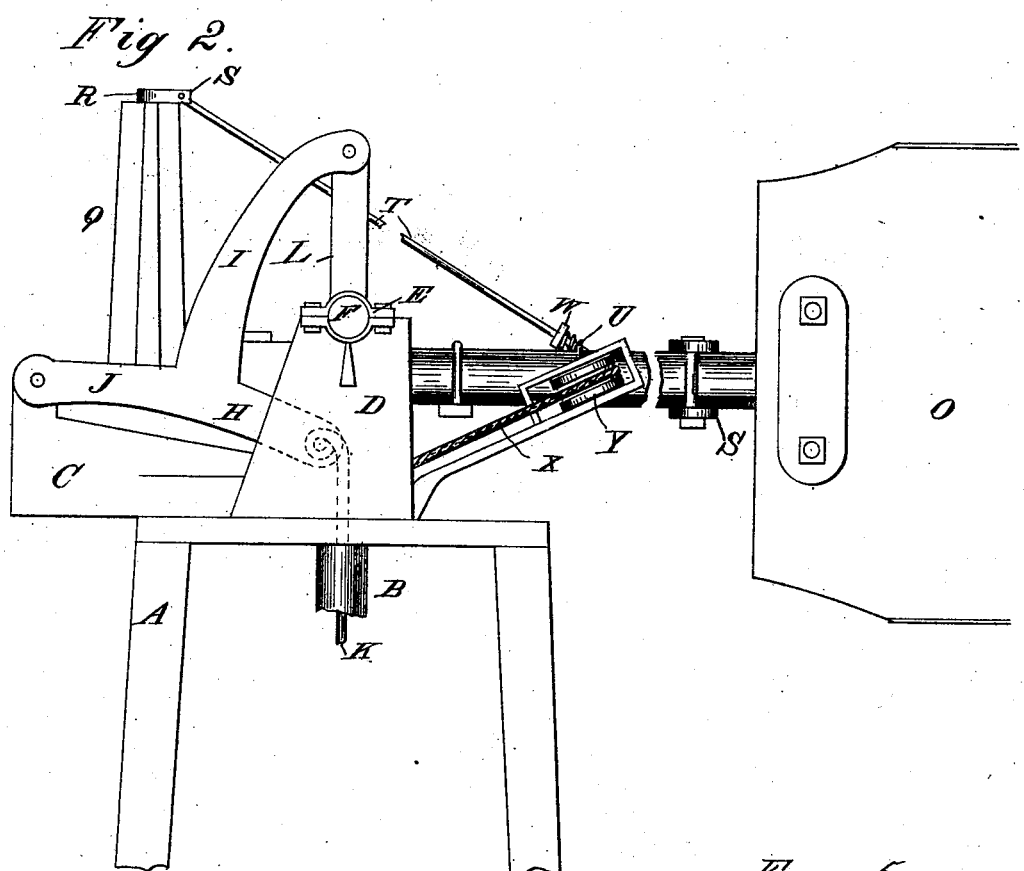
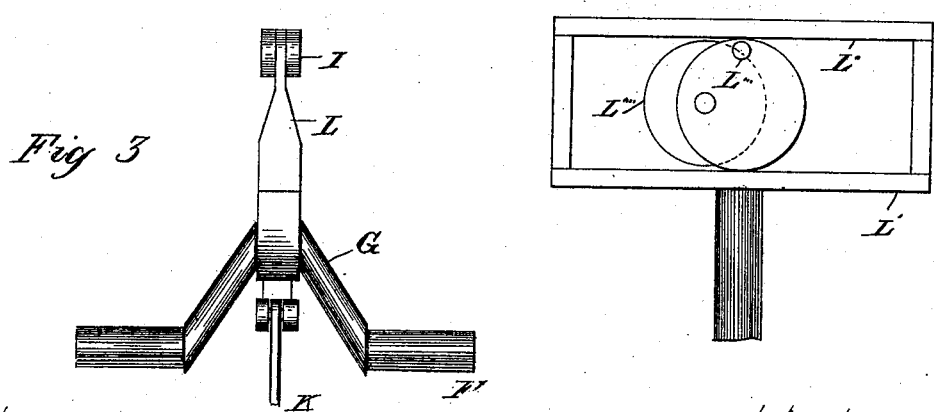
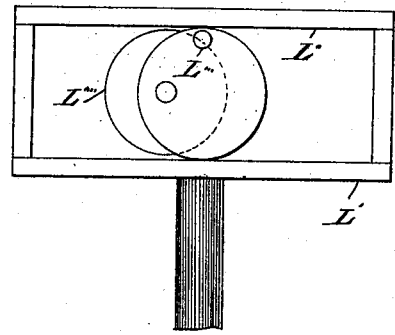
WITNESSES
INVENTOR
Edward Williams
by his Atty Frank L. Dyer

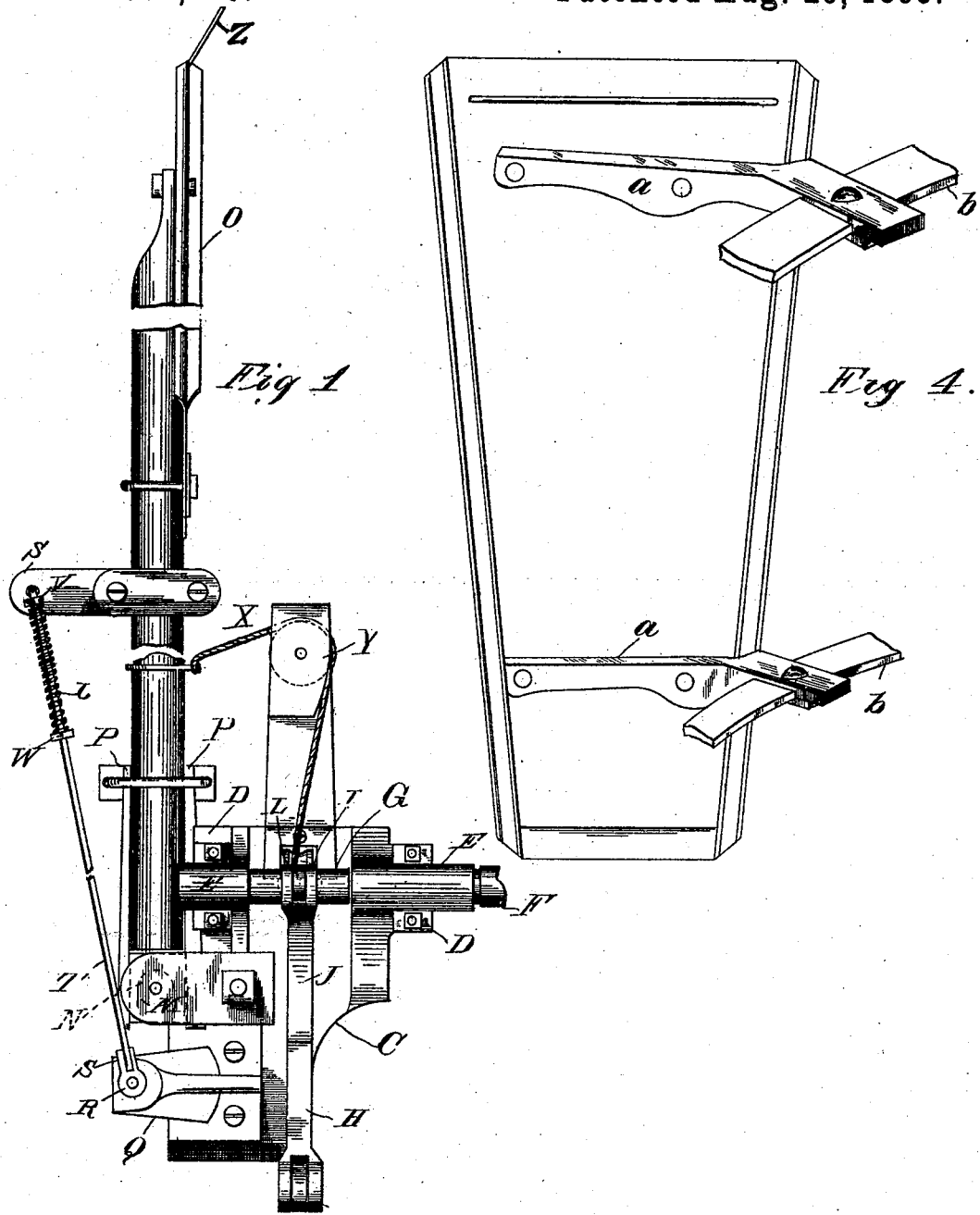

UNITED STATES PATENT OFFICE.

EDWARD WILLIAMS, OF DUBUQUE, IOWA.

WINDMILL.

SPECIFICATION forming part of Letters Patent No. 504,185, dated August 29, 1893.

Application filed August 21, 1891. Serial No. 403,328. (No model.)

*To all whom it may concern:*

Be it known that I, EDWARD WILLIAMS, a citizen of the United States, residing at Dubuque, in the county of Dubuque and State of Iowa, have invented certain new and useful Improvements in Windmills; and I do hereby declare the following to be a full, clear, and exact description of the invention, which will enable others skilled in the art to which it appertains to make and use the same.

My invention relates to various new and useful improvements in windmills, and the particular variety of windmills to which the invention has especial reference is that wherein the power is transmitted through a system of lever and crank arms connected with the wind wheel shaft.

The principal object of the invention is to provide and produce a windmill wherein the speed of the windwheel will be automatically regulated so as to be uniform under varying loads and with different velocities of wind.

Another object of the invention is to provide a windmill, wherein, when the windwheel is moved out of the wind so as to arrest its rotation, it will always remain in that position and will not be forced back into the wind, as is the case with some varieties of windmills.

Another object of the invention is to provide certain new and useful improvements whereby power will be transmitted from the windwheel and whereby the movement of the reciprocating vertical shaft will be in a substantially straight line; and a still further object of the invention is to provide and produce an improved form of windwheel whereby the blades will be firmly held in position and may be removed when necessary for any particular purpose.

The particular novelties of the invention consist in mounting a windwheel on one side of the vertical shaft and in pivoting a fan or vane to the other side of the vertical shaft and in connecting said fan or vane to the main frame of the mill so that when the wind attains too great a velocity and exerts more than the desired amount of pressure upon the windwheel, the latter will be thrown more or less out of the wind so as to expose a smaller surface to the action thereof and the fan or vane will be slightly elevated, so as to count or balance the effect of the wind and in providing the fan or vane at its end with a bifurcated portion whereby the wind wheel (when it has been moved up out of the wind to arrest its progress) will be always held in this position, and in providing an improved system of levers in connection with the windwheel shaft so that the movement of the vertical shaft will be in a substantially straight line, as well as in other but less important details of construction, all as will be more fully hereinafter described and claimed, and which are illustrated in the accompanying drawings forming a part of the specification, and in which—

Figure 1 is a plan view; Fig. 2 a side elevation; Fig. 3 an enlarged elevation of the levers and crank connections; Fig. 4 an enlarged perspective view illustrating the manner of attaching the blades to the windwheel in position and Fig. 5 a modification of Fig. 3.

In all the above views corresponding parts are designated by similar letters of reference.

A, is the usual windmill tower, made of inclined standards and provided at its top with a suitable casting to receive the bearing tube B of the windmill proper. The bearing tube B is provided at its upper end with the main casting C, of the windmill, which casting may be made either integral with said bearing tube or separate therefrom, and attached thereto in any suitable manner. The base C is provided at its front and rear portions with the standards D, D, carrying bearing boxes E at their upper ends. Mounted within these bearing boxes is the windwheel shaft F, which is provided with a crank portion G between the bearing boxes E. Mounted at one side of the main frame or casting C is the lever H having a curved extension I thereon and with a horizontal extension J which is directly over the opening of the bearing tube B and which connects with the vertical shaft or rod K. The rod or shaft K connects with and operates the pump or other mechanism in the usual way. Engaging the upper portion of the curved extension I with a crank portion G of the windwheel shaft, is a pitman L. It will be seen that when the windwheel shaft is revolved, the curved extension I of the lever H will be moved upward and downward by means of the pitman L, and the vertical shaft or rod K will be carried in the same direction. Owing to the length of the lever H and to the fact that it is pivoted to one side of the base C the movement of the vertical rod K will be approximately vertical. Instead of this arrangement of levers the modification illustrated in Fig. 5 may be used.

L' is a hollow frame corresponding with the lever H, and pivoted at one side to the main frame or casing. This hollow frame L' is provided with a bearing track L'' upon its interior as will be seen from an inspection of Fig. 5. When this modification is made use of, the crank portion G is dispensed with and a cam or eccentric L''' is secured to the shaft F. This cam or eccentric is provided with a friction wheel or roller L'''' which bears upon the interior track L'' before referred to. The hollow frame is connected at its lower end to the vertical shaft or rod, so as to operate the same in a manner similar to the lever H. This modification is intended to operate as follows: When the windwheel shaft F is revolved, the roller L'''' on the cam or eccentric L''' will bear against the track L'', so as to move the hollow frame L' up and down and carry the shaft or rod K with it. By making use of the bearing roller L'''' the friction will be reduced and by using the cam or eccentric there is no necessity of making the wind wheel shaft with a crank portion. The base or main casting of the windmill is provided at its rear portion with two horizontal lugs M, M, within which is vertically mounted an upright standard. Pivoted at either end to said horizontal lugs is the usual fan or vane O which is attached in any ordinary manner to its shaft and this shaft is hinged to the standard N, so as to be capable of movement up and down. By this means it will be seen that the fan or vane is connected to the base C by an universal joint so that it may be moved upwardly and to one side. The fan or vane is prevented from moving farther away from its horizontal position in an opposite direction from the windwheel shaft for the reason that one of the bifurcated arms P of this shaft will come into contact with the back of the main casting C as will be seen in Fig. 1. Extending up from the main casting is a supporting arm Q having a vertical pivot at its upper end as shown. Horizontally mounted on this pivot is a flat arm R having the small lugs S, S, thereon. Extending through these lugs is a moving rod T which connects at its lower end through suitable links with the fan or vane. This rod T is provided with a spring U which bears against the lower lug S and against the nut V which is placed upon the rod T. The spring U is preferably an ordinary spiral spring but if need be a leaf spring may be substituted. The upper end of the rod T is provided with another nut W, which will engage when the rod is moved backwarldy as far as possible with the upper lugs S. It will be seen by these means that the fan or vane will be always slightly elevated out of the horizontal position by means of the spring U, but it may be moved slightly downward against the tension of the spring. When the fan or vane is be moved out of the wind to stop the movement of the windwheel, the chain or wire X is made use of. This chain or wire X, connects with the fan or vane and passes over the pulleys Y, Y, down through the bearing tube B. When the chain X is moved downwardly, the fan or vane will be moved to a position at right angles to the windwheel shaft and since this fan or vane will always remain in the plane of the wind, it follows that the windwheel will be moved to a position parallel to the path of the wind so that the movement of the windwheel will therefore cease.

The windmill is regulated substantially as follows: When the wind attains too great a velocity it will tend to throw the windwheel into an inclined position to the path of the wind the angle of inclination varying according to the pressure as will be understood. This movement of the wind wheel will carry the upright standard N away from the fan or vane which will cause the fan or vane to be slightly elevated by means of the different connections which will exert pressure in opposition to the force of the wind. It will be seen that by making use of the spring U the first effect when the windwheel is thrown out of its normal position will be to oppose the tension of the spring and when the spring is moved so that the nut W will come into contact with the upper lug S, then the fan or vane will be elevated. When the velocity of the wind decreases the fan or vane by its weight, or the spring U by its tension will return the windwheel to its normal position directly in the path of the wind. It has been found that when the windwheel is thrown out of the path of the wind in order that its movement may be arrested, that the fan or vane will be moved rapidly backward and forward so as to throw the wheel in and out of the wind. In order to overcome this, the fan or vane is provided with a deflected portion Z at its rear end as shown in Fig. 1 so that when the windwheel and fan are parallel with each other the tendency of this deflected portion will be to prevent the wind wheel from swinging in a direction toward the wind. I therefore overcome a serious objection to former windmills in a very simple way and it has been found in practice that by making the fan or vane with a deflected portion as I have just described, the windwheel, when it is thrown out of the wind, will always retain that position. The fan or vane O is provided at its top and bottom with deflected ribs facing in opposite directions. The particular object of these ribs is that they materially strengthen the fan or vane and prevent it from becoming warped. Another object is that they enable the fan or vane to move around easily with the different changes of the wind. In Fig. 4 is shown the manner of attaching the blades in position on the windwheel. I take two or more metal bands $a$, and bolt or secure them in any suitable way to the blades of the windwheel. To these bands are secured a number of deflected arms $b$, bolted in position to the bands $a$, as shown. Each blade of the windwheel is bolted or riveted to these deflected arms so as to firmly retain its position thereon. Should any blade become broken, the deflected arms may be easily removed and a new blade be placed in position. Each windwheel blade is deflected at its edge and side as shown, so as not only to materially strengthen the same but to enable the blade to receive a larger quantity of wind and to move more easily around in its path.

Having now described my invention, what I claim as new therein, and desire to secure by Letters Patent, is as follows:

In a wind mill, a horizontal main shaft carrying a wind wheel; a horizontally mounted vane, pivotally mounted on the same horizontal plane with, but to one side of said main shaft; a supporting rod, secured to said vane, and to a point above the pivot of the vane, but farther removed from the main shaft than the vane, substantially as described.

EDWARD $\overset{\text{his}}{\underset{\text{mark}}{\times}}$ WILLIAMS.

In presence of—
  M. M. CADY,
  J. F. NELSON.